US008378977B2

(12) United States Patent
Guenther (10) Patent No.: US 8,378,977 B2
(45) Date of Patent: Feb. 19, 2013

(54) DEVICE FOR ELECTRONICALLY CAPTURING A HANDWRITTEN USER INPUT

(75) Inventor: Andreas Guenther, Stuttgart (DE)

(73) Assignee: StepOver GmbH, Stuttgart (DE)

( * ) Notice: Subject to any disclaimer, the term of this patent is extended or adjusted under 35 U.S.C. 154(b) by 873 days.

(21) Appl. No.: 12/151,523

(22) Filed: May 7, 2008

(65) Prior Publication Data
US 2008/0277170 A1 Nov. 13, 2008

Related U.S. Application Data

(60) Provisional application No. 60/928,194, filed on May 8, 2007.

(51) Int. Cl.
*G08C 21/00* (2006.01)
(52) U.S. Cl. ............ 345/173; 345/179; 178/18.03
(58) Field of Classification Search .......... 345/173–179; 178/18.03
See application file for complete search history.

(56) References Cited

U.S. PATENT DOCUMENTS

| D307,134 S | 4/1990 | Makidera |
| 5,103,486 A | 4/1992 | Grippi |
| 5,375,226 A | 12/1994 | Sano et al. |
| 5,389,745 A * | 2/1995 | Sakamoto .............. 178/18.03 |
| 6,177,926 B1 * | 1/2001 | Kunert .............. 345/173 |
| 6,757,156 B2 | 6/2004 | Adams et al. |
| D532,009 S | 11/2006 | Zank et al. |
| 2002/0129257 A1 * | 9/2002 | Parmelee et al. ........... 713/180 |
| 2003/0132918 A1 | 7/2003 | Fitch et al. |
| 2006/0138228 A1 | 6/2006 | Sanders et al. |

FOREIGN PATENT DOCUMENTS

| CA | 2 373 220 A1 | 11/2000 |
| DE | 198 11 930 A1 | 9/1999 |
| DE | 198 59 932 A1 | 6/2000 |
| DE | 10 2006 000 859 A1 | 7/2007 |
| EP | 1489481 | 12/2004 |

OTHER PUBLICATIONS http://www.interlinkelectronics.com/library/media/papers/pdf/ePad%20family%20Brochure%202006.pdf, Interlink Electronics, Inc., pp. 1-4, 2007, Camarillo, CA 93012.
http://www.topazsystems.com/products/specs/SigGemColor57.pdf, Topaz Systems, Inc., pp. 1-2, 2003-2006, Simi Valley, CA 93065.
U.S. Appl. No. 11/964,293, filed Dec. 26, 2007, Guenther.
http://www.topazsystems.com/products/index.htm, Electronic signature pad options, p. 1, 2003-2005, Simi Valley, CA 93065.

* cited by examiner

*Primary Examiner* — Amare Mengistu
*Assistant Examiner* — Jennifer Zubajlo
(74) *Attorney, Agent, or Firm* — Simpson & Simpson, PLLC

(57) ABSTRACT

A device configured to electronically capture a handwritten user input includes an input field asymmetrically disposed on a housing in order to provide a sufficient surface for resting a right-hand on the housing when a right-handed person makes an input on the input field. The device is rotatable by 180° and the input field is re-configurable, so that a left-handed person can comfortably make an input on the input field with the left-hand resting in a natural posture on the same hand-resting surface of the housing.

11 Claims, 9 Drawing Sheets

DEVICE FOR ELECTRONICALLY CAPTURING A HANDWRITTEN USER INPUT

CROSS-REFERENCE TO RELATED APPLICATIONS

This application claims priority to U.S. provisional application no. 60/928,194 filed May 8, 2007, the contents of which are incorporated herein by reference as if fully set forth herein.

TECHNICAL FIELD

The present invention relates to a device for electronically capturing or recording a handwritten user input, such as, e.g., a signature. Such devices are also sometimes called "signature pads."

BACKGROUND OF THE INVENTION

Devices for electronically capturing a handwritten user input are marketed by the assignee of this invention, StepOver GmbH, Germany, under the trademarks: blueMobile Pad, plusPad, blueM Pad and +Pad II/III. Such devices are also generally known from German patent publication no. 198 59 932 A1. In general, such devices and/or signature pads comprise a housing adapted to be attached to a wall or adapted to be set on a base, e.g., a table or the like. The housing includes an input field on the front side of the housing. A user can make an input on the input field, e.g., using a normal pen or also using a writing implement adapted to the type of the input field. In particular, such devices and/or signature pads are utilized for the purpose of electronically capturing a signature of a user and optionally for further processing and/or storing of the captured signature data.

Electronics for this processing are accommodated in the housing underneath the input field. Such electronics facilitate the electronic capture of the user input on the input field and/or allow the digital storage thereof. Current is supplied to the device either via a network cable or via batteries or accumulators integrated in the apparatus and/or the signature pad.

In the above-mentioned devices and/or signature pads, the input field, on which a user can make a handwritten user input using a writing implement, is disposed centrally and/or in the middle relative to the right and left housing edges of the device. However, it has been found that a user can not optimally sign on the input field of such a known device, since such known apparatuses have relatively small outer dimensions, while also having a minimum thickness of more than 1.6 cm or even more than 2.0 cm.

Consequently, on the one hand, a user can not fully rest his/her writing hand on the housing when signing on the input field and, on the other hand, it is not reasonable for the user to support his/her writing hand partially on the housing and partially on the base or the wall due to the thickness of the housing (i.e., the relatively large distance between the top surface of the housing and the base, on which the device is set), because such an awkward, tilted positioning of the hand is inconvenient and/or uncomfortable when signing.

BRIEF SUMMARY OF THE INVENTION

However, it has been determined that the known devices of the above-mentioned type for electronically capturing a handwritten user input can be improved, preferably by configuring the housing so that a user can more conveniently or comfortably input handwritten information via the input field of such devices.

Thus, there is a need in the field to develop a more user-friendly or ergonomic device for electronically capturing or recording a handwritten user input.

In one aspect of the present teachings, a device is taught for electronically capturing a handwritten user input, which device includes an input field disposed in or on a housing. The housing preferably has a front side, a rear side opposite to the front side, a right housing edge, a left housing edge opposite to the right housing edge, a lower housing edge and an upper housing edge opposite to the lower housing edge. The input field is preferably constructed or configured or programmed so as to electronically capture or record a handwritten user input, which is made by a user by contacting or touching the user input field with a writing device, such as a stylus or pen. In addition, the input field can be constructed or configured or programmed to display the handwritten user input and/or inputted elements, etc., e.g., preferably in real-time while the handwritten data is being input via the input field. A touch screen, e.g., an LCD touch screen, is a representative, but not limiting, embodiment of an input field that may be utilized with the present teachings.

The electronics for the electronic capture and optional storage of the corresponding data, which data correspond to the input made by the user, are accommodated inside the housing. The input field is preferably disposed on the front side of the housing asymmetrically between the right housing edge and the left housing edge. The electronics for capturing and processing the handwritten data are preferably located adjacent to the input field, rather than exclusively underneath the input field, so that the housing for the device can be made thinner.

In this aspect of the present invention, the input field is preferably eccentrically arranged or disposed relative to the outer periphery of the device housing, so that a surface or portion of the housing, which is available to the user for resting the writing hand thereon while the input is being made, is enlarged. It is possible to enlarge the hand-resting surface or portion of the housing, even if the outer dimensions of the housing are essentially identical as compared to previously-known devices of this type. In addition, the asymmetric arrangement of the input field relative to the outer periphery of the housing facilitates a natural and comfortable writing posture of the user while the input is being made by the user.

For example, a larger surface between the right edge of the input field and the right housing edge can be created for a right-hander (i.e., a person who writes with his/her right hand in order to input the handwritten information (e.g., a signature)), if the input field is arranged or positioned in an offset manner more towards the left housing edge relative to the middle position. In this case, the right-handed user, who holds the writing device in his/her right hand while making the input, can comfortably rest his/her right hand in a natural posture on the housing, in a manner similar to writing on a large sheet of paper.

For a left-hander, the input field can be arranged or positioned in an offset manner more towards the right relative to a middle positioning of the input field, so that a larger resting surface for the writing hand can be created between the left edge of the input field and the left housing edge. The left-handed user, who holds the writing device in his/her left hand while making the handwritten input, can comfortably rest his/her left hand in a natural posture on the top surface of the housing, again in a manner similar to writing on a large sheet of paper.

According to an exemplary preferred embodiment, it is possible for right-handers as well as left-handers to utilize the device of the present teachings. For this purpose, the housing can be rotated by 180° about an imaginary axis of symmetry (e.g., an axis that extends vertically relative to the front or top side of the housing) from the data-entry position for a right hander to the data-entry position for a left-hander. As a result, a left-hander also has more resting surface for his/her left hand on the front side of the housing when making an input on the input field, if he/she holds the pen in his/her left hand.

The surface on the front side of the housing, which is available for resting the user's hand when signing or inputting other handwritten data on or via the input field, can be further enlarged, if the input field is also disposed or located asymmetrically between the lower housing edge and the upper housing edge. In other words, the input field is preferably displaced or offset closer to the upper housing edge in the writing (data-entry) position for a right-hander, so that the distance between the upper edge of the input field and the upper housing edge is less than the distance between the lower housing edge and the lower edge of the input field. In this case, it is ensured that the hand-resting surface on the front side of the housing for a right-hander, i.e., the surface between the lower housing edge and the lower edge of the input field, is larger than for previously-known devices, even if, e.g., the overall dimensions of the housing are left unchanged relative to the previously-known housings of such devices and/or signature pads.

As was mentioned above, due to the present asymmetric arrangement of the input field relative to at least one pair of opposing housing edges, it is possible to enlarge the hand-resting surface for a user, e.g., despite the overall dimensions of the housing being unchanged. It is also possible for right-handers as well as for left-handers to utilize such a device.

According to another exemplary representative embodiment of the present teachings, it is also possible to design the user input field so as to be reversible or convertible between a first usage position and a second usage position. In the first usage position, a user input can be electronically captured in an orientation-specific manner, such as e.g., in the orientation that is intended for a right-hander. In the second usage position, which is different from the first usage position, such, e.g., by rotating the device by 180° so that the device is adapted or oriented for a left-hander, a user input can also be electronically captured in an orientation-specific manner. For example, in one representative embodiment, it is possible to always correctly display a signature line along the lower portion of the input field in the first and second usage positions for the user. As a result, left-handed users and right-handed users can properly enter the signature on or adjacent to this signature line in each of the first and second usage positions.

In addition, according to a further exemplary representative embodiment of the present teachings, it can be advantageous to design the switchability or convertibility of the input field, so that the handwritten input (e.g., a signature) is correctly captured or recorded in an orientation-specific manner. In other words, the coordinate system assigned to the input field is changed in accordance with the usage position. Thus, independent of the usage position in which the input was made, the captured data belonging thereto are represented using essentially the same coordinate system.

In a further exemplary representative embodiment of the present teachings, an activatable visual symbol is displayed as an input element on the user input field. This activatability feature can be designed such that, by tapping on the symbol using a writing element, a conversion of the user input field takes place from one usage position into another usage position, e.g., from a right-hand user position into a usage position for a left-hander. At the same time, the device is electronically switched or re-configured so that the signature or other handwritten data-entry can then be made by a left-hander, e.g., with the device rotated by 180° about a vertical axis. As was indicated above, the location of the displayed signature line may be changed in accordance with the desired usage position. The storage of the captured data is then converted into a common coordinate system. In other words, a common coordinate system can be utilized to store the captured data (e.g., signature data) for right-handers and left-handers.

According to a further aspect of the present teachings, an electronic device of the above-mentioned type and/or a signature pad can be made more user-friendly by positioning or placing or disposing the electronic components, which are required for operating the user input field and for electronically capturing the user input, in the housing interior space located between the lower housing edge and the user input field. Contrary to the former designs of signatures pads with displays (such as, e.g., LCD-displays, TFT-displays, etc.), in which these electronic components are located underneath the user field, the present design makes it possible to reduce the overall thickness of the housing and the device.

For example, in some embodiments of the present teachings, it is possible to reduce the overall thickness or the maximum thickness of the housing and/or the device to about 1.3 cm, or even less than about 1.1 cm. Thus, as compared to previously-known devices, it can be substantially more pleasant or comfortable for a user to rest his/her hand on the housing and/or the hand-resting surface on such a flat housing when signing, since the gradation or step from the device-supporting surface (e.g., a table) to the writing surface of the device (i.e., the top or front surface of the device) is less noticeable and thus is less unpleasant or uncomfortable for the user. In this regard, for the purpose of a complete disclosure, it is noted that the improved lay-out of the electronic components, which lay-out can facilitate the reduction of the overall thickness of the device and/or the housing of the device, can also be provided independent of the asymmetric arrangement of the user input field relative to the housing.

According to a further aspect of the present teachings, a device for electronically capturing a user input, such as, e.g., a signature, includes a housing and a user input field. The housing has a housing interior space, a front side, a rear side opposite to the front side, a right housing edge, a left housing edge opposite to the right housing edge, a lower housing edge and an upper housing edge opposite to the lower housing edge. The user input field is designed to electronically capture or record a handwritten user input that the user makes on the user input field using a writing device. The electronics and/or the electronic components, which are required for operating the user input field and for electronically capturing the user input, are located or disposed in the housing interior space between the lower housing edge and the user input field. Therefore, the thickness of the housing between the front side and the opposing rear side of the housing is less than about 1.3 cm, more particularly less than about 1.1 cm or even less than about 1.0 cm.

For the sake of clarity, it is noted that the terms 'right', 'left', 'lower', 'upper' are utilized herein in an exemplary manner and only for indicating the respective components. These terms relate in particular to a plan view of an exemplary inventive device, as is shown, e.g., in FIG. 1. Thus, for example, the particular edge, which is indicated by the term 'lower', is shown towards the lower edge of the paper in this plan view. If the device is rotated by 180°, then the respective edges can also be indicated with the same references, so that the right edge now lies towards the left edge of the paper, etc.

DETAILED DESCRIPTION OF EXEMPLARY EMBODIMENTS

Figure 1:
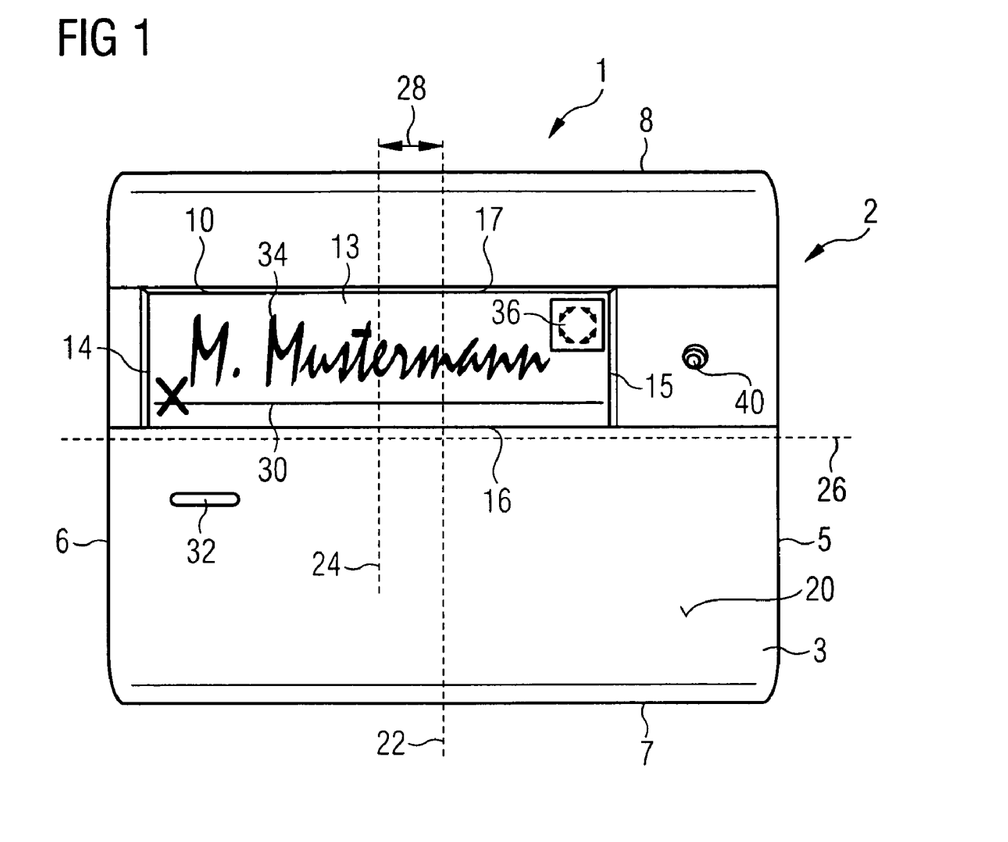
FIG. 1 shows a top view of a first exemplary device for electronically capturing a handwritten user input, such as e.g., a signature, in a writing or data-entry position intended for a right-hander.

The plan view of FIG. 1 shows a first exemplary embodiment of a representative device 1 configured to electronically capture or record a handwritten user input, such as, e.g., a signature. Device 1 preferably comprises an essentially rectangular or quadratic housing 2, which is comprised of a front housing part 3 and a rear housing part 4. However, other shapes for housing 2 are, of course, possible based upon the intended application for the present teachings. A generally rectangular opening or cut-out 10 is located in front housing part 3. An input field 13 is located in and/or under rectangular opening 10. A handwritten user input, e.g., a signature 34, can be made on input field 13 using a pen or stylus 33, as is shown in FIG. 3.

In the depicted plan view, housing 2 has a right edge 5, a left edge 6, a lower edge 7 and an upper edge 8. The nomenclature for edges 5-8 of housing 2 can also be utilized as such for the edges of rectangular opening 10.

Input field 13 may have a known construction so that, generally speaking, no further explanations are necessary for the construction and the operation thereof. For the sake of good order, reference is made to previous publications of StepOver GmbH, Germany, which markets so-called signature pads having a corresponding input field, e.g., under the trademarks: blueMobile Pad, plusPad, blueM Pad and +Pad II/III.

Figure 3:
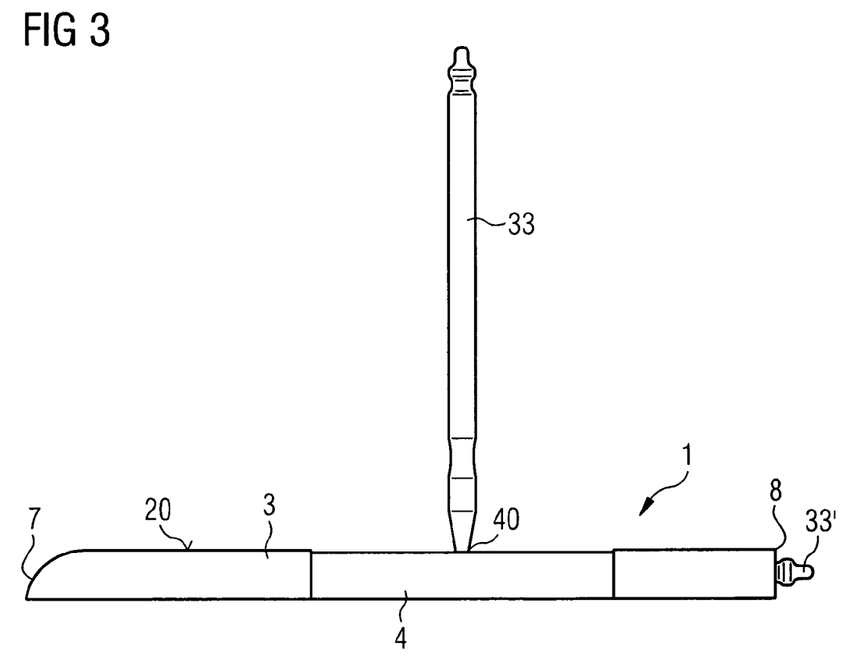
FIG. 3 shows a side view from the right of the device shown in FIG. 1.

Input field 13 can be embodied in the form of a touch device or touch screen, e.g., an LCD touch screen, which is actuatable using pen 33, as is shown, e.g., in FIG. 3. With such a device, it is also possible to capture the coordinates of the script and/or signature 34 as the input is being made on touch device 13 and/or to capture the amount of pressure applied at each coordinate or position on the touch screen over the course or progression of the handwritten input. Signature 34 or other handwritten input is then available in the form of an analog or digital data record.

In addition, a real-time clock can be integrated into device 1, so that a time stamp generated by the real-time clock can be correlated with each captured data record of the script coordinates and/or the captured data record of the course of applied pressures. Preferably, an indication code is added to each captured data record of the script coordinates and/or the captured data record of the course of applied pressures. The identification code is preferably individualized for the device that was utilized for the capture of the handwritten input. This identification code can be stored in a memory chip, which may preferably be a ROM or other semiconductor memory that is disposed in housing 2. A further improvement of the data security is achieved by having a processor disposed in housing 2 generate a process identification code individualizing the input for each user input and by adding this code to the data record of the script coordinates and/or the data record of the course of applied pressures. Reference is made to the disclosure of DE 10 2006 000 859.6 for further details, which is incorporated herein by reference.

As is apparent in FIG. 1, input field 13 is eccentrically or asymmetrically positioned relative to housing 2, i.e., relative to outer edges 5-8 of housing 2. In the present embodiment, the distance between left housing edge 6 of housing 2 and a left edge 14 of input field 13 is less than the distance between right housing edge 5 of housing 2 and a right edge 15 of input field 13. As a result of this particular arrangement, it is possible for a right-hander to make or write input 34 on input field 13 using pen 33 with the hand and forearm in a comfortable, natural position while entering the handwritten input, if the user rests at least a part of the hand, which is holding pen 33, on the portion of front housing part 3 forming a hand-resting surface 20. Hand-resting surface 20 is the area between a lower edge 16 of input field 13 and lower housing edge 7 of housing 2. The offset of input field 13 is clearly shown in FIG. 1 as a lateral offset distance 28 between a middle line 22 of housing 2 and a middle line 24 of input field 13.

The readiness-for-operation of the device shown in FIG. 1 may be indicated, e.g., by a LED-lamp 32, which may be a horizontal, oblong element located in the left, lower portion of housing 2. LED-lamp 32 can illuminate, e.g., green, when a signature is to be captured, and can be illuminated orange/yellow, when the readiness-for-operation is to be indicated. LED-lamp 32 may also illuminate red when a malfunction is present.

The electronic current is supplied to the device shown in FIG. 1 via a cable 23 (see FIG. 6) that leads and/or penetrates through one edge 5-8 of housing 2. Optionally, a cable-less design is also possible. In this case, the energy is supplied by batteries or an accumulator (e.g., rechargeable battery).

As shown in FIG. 1, an insertion opening 40 is provided in housing 2 between right housing edge 5 and right edge 15 of input field 13. The tip of pen 33 is insertable into insertion opening 40. Thus, pen 33 can be stored, ready-for-use, in a convenient way. In order to prevent pen 33 from being lost, an accommodation opening having a cavity 62 (see FIGS. 7 and 8) with a length substantially equal to the length of pen 33 is also provided in the left, upper edge portion of the housing 2. The pen 33 is nearly completely insertable into the accommodation opening/cavity, so that only the rear end of pen 33 protrudes from the opening. This pen-inserted position is denoted with reference number 33' in FIG. 3.

FIG. 3 shows pen 33 inserted into insertion opening 40 and FIG. 3 is a side view of the embodiment of the present invention shown in FIG. 1. The end of pen 33 is formed as a thin bar or pin, so that it is easily graspable in the inserted position 33'. It is also easily recognizable from the illustration of FIG. 3 that lower housing end 7 of housing 2 is rounded. Lower edge 7 can also be flattened or chamfered or beveled. It is possible to conveniently rest the hand making the signature on hand-resting portion 20 of housing 2 during a handwritten user input. As is readily apparent from FIG. 1, upper edge 8 is also rounded to provide an aesthetically-pleasing design. However, as is apparent from the side view of FIG. 3, upper edge 8 could instead be formed as a wall that extends perpendicular or inclined to the upper side of housing 2.

Figure 2:
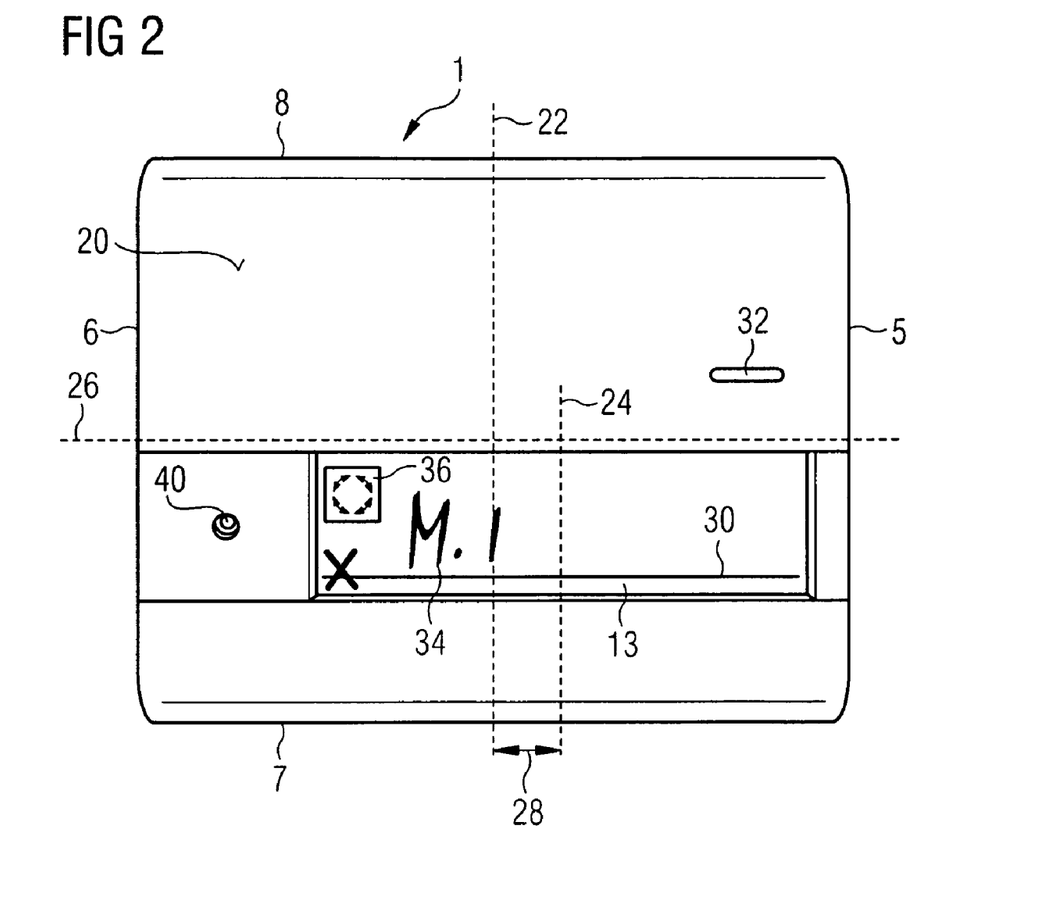
FIG. 2 shows a plan view of the device shown in FIG. 1 for electronically capturing a user input, such as, e.g., a signature, in a second writing or data-entry position that is suitable for a left-hander.

A plan view of a device for capturing signatures and other handwritten information is also shown in FIG. 2. As distinguished from the view shown in FIG. 1, input field 13 is disposed on the right side of the front side of housing 2 in FIG. 2, and the distance between housing edge 5 and edge 15 of input field 13 is less than the corresponding distance shown in the view of FIG. 1. This orientation or rotational position of device 1 is intended for a left-hander. Thus, the embodiments of FIGS. 1 and 2 are actually identical, but the device of FIG. 2 is rotated by 180° relative to the device as shown in FIG. 1.

Figure 5:
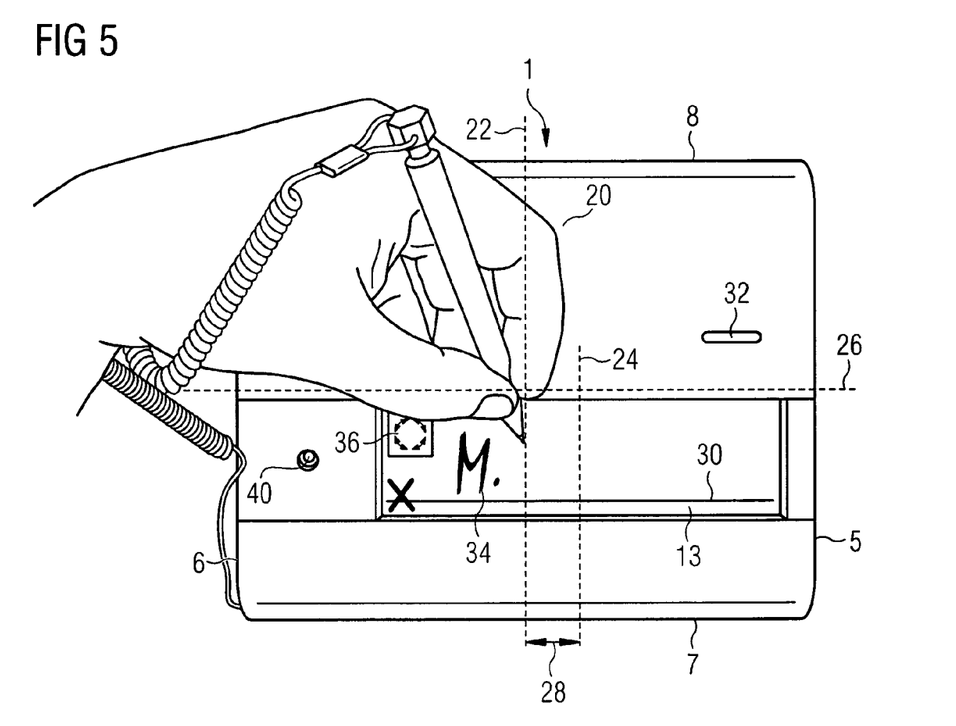
FIG. 5 shows a plan view of the exemplary embodiment of the device according to FIG. 2, which is being used by a left-hander.

In both of FIGS. 1 and 2, input field 13 includes a signature line 30, on or above which signature 34 can be made by a user via pen or stylus 33. Signature 34 is preferably displayed on the screen or display disposed under transparent input field 13 (e.g., using 'electronic ink', i.e., the display is electronically actuated to show the signature on the display) in real-time while the signature is being made. Furthermore, a special symbol 36 is displayed in input field 13, preferably in the right, upper corner according to the illustration of FIG. 1. Device 1 is preferably configured or programmed such that, when the user taps or touches symbol 36 using pen 33, device 1 takes into consideration, during the capture of the handwritten input, that signature 34 is being made on input field 13 with housing 2 rotated by 180°, as is shown in FIGS. 2 and 5. That is, the handwritten input is being made by a user, who is left-handed.

Figure 4:
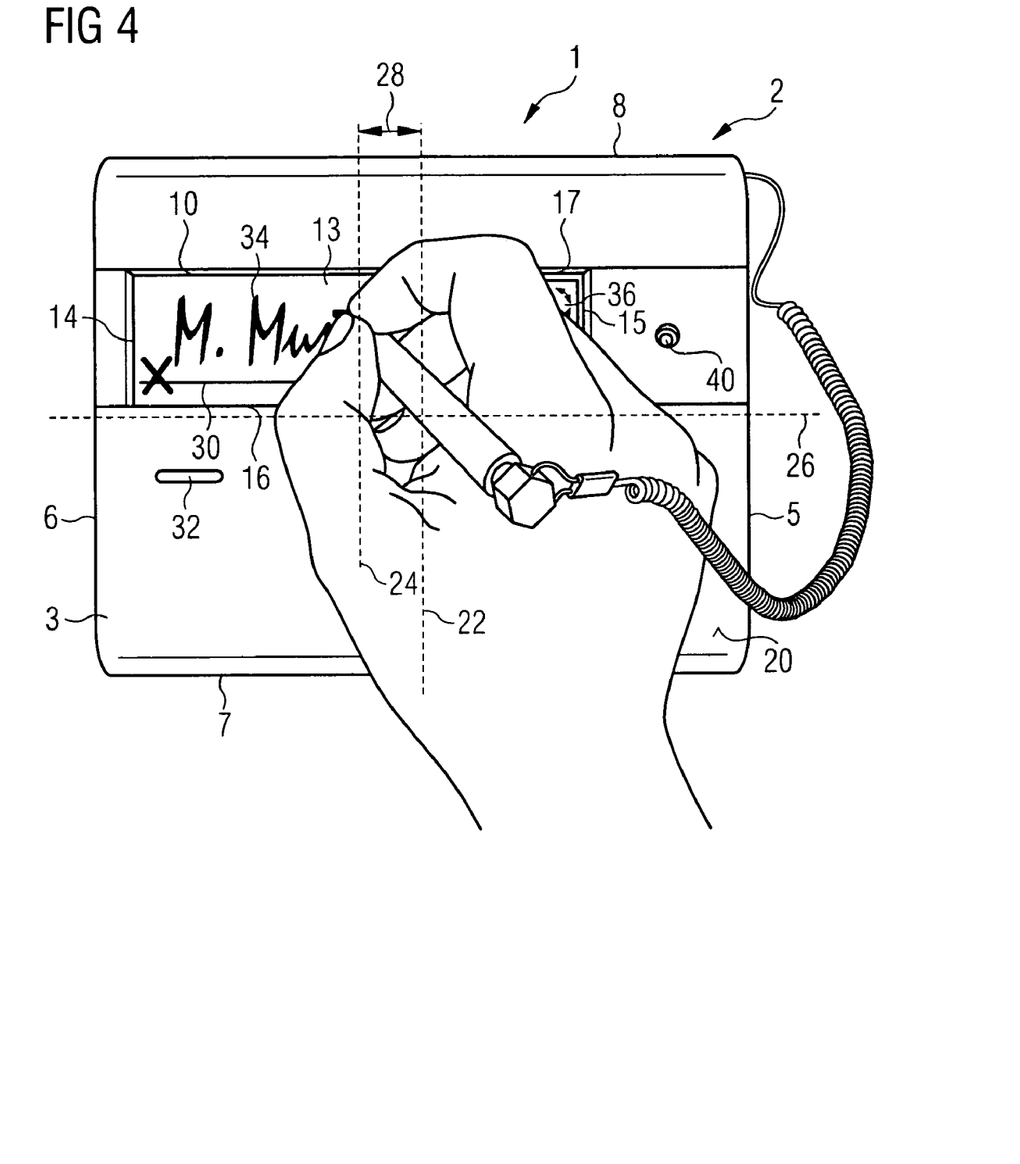
FIG. 4 shows a plan view of the exemplary embodiment of the device according to FIG. 1, which is being used by a right-hander.

In the rotational position or orientation of device 1 suitable for a left-hander, as is shown in FIGS. 2 and 5, hand-resting surface 20 is oriented at the top in the plan view and input field 13 is disposed in the right, lower corner of housing 2. As a result, a left-hander can make signature 34 on input field 13 in a natural position or posture for the left hand. By tapping symbol 36, the device 1 is adapted to display signature line 30 in the position shown in FIGS. 2 and 5, i.e., along the lower edge of input field 13. Further, symbol 36 is then displayed in the left, upper corner of input field 13. If a right-hander then intends to sign again after the left-hander has signed, symbol 36 is again tapped and housing 2 is rotated, so that device 1 again assumes the position shown in FIGS. 1 and 4. Then, signature 34 can again be made by a right-hander.

As is illustrated in FIGS. 1, 2 and 4, 5, input field 13 is eccentrically or asymmetrically located relative to edges 5-8 of housing 2. In particular, the plan view of FIG. 1 shows that line of symmetry 22, which separates housing 2 into two equal halves, lies at lateral offset distance 28 from line of symmetry 24 of input field 13. Lateral offset distance 28 of input field 13 relative to line of symmetry 22 of housing 2 preferably amounts to, e.g., about 20-40 mm, more preferably about 30 mm.

Figure 6:
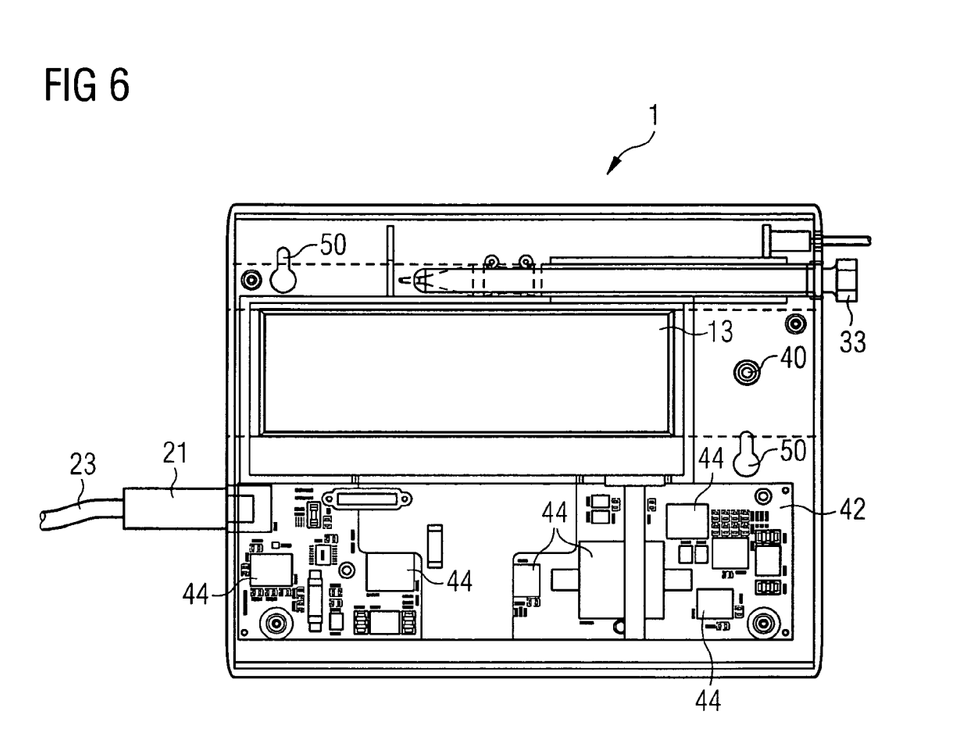
FIG. 6 shows a plan view of the device shown in FIGS. 1 and 2 for electronically capturing a user input, such as, e.g., a signature, wherein the front housing part is removed and the individual components, which are accommodated in the housing interior space, are visible.
Figure 7:
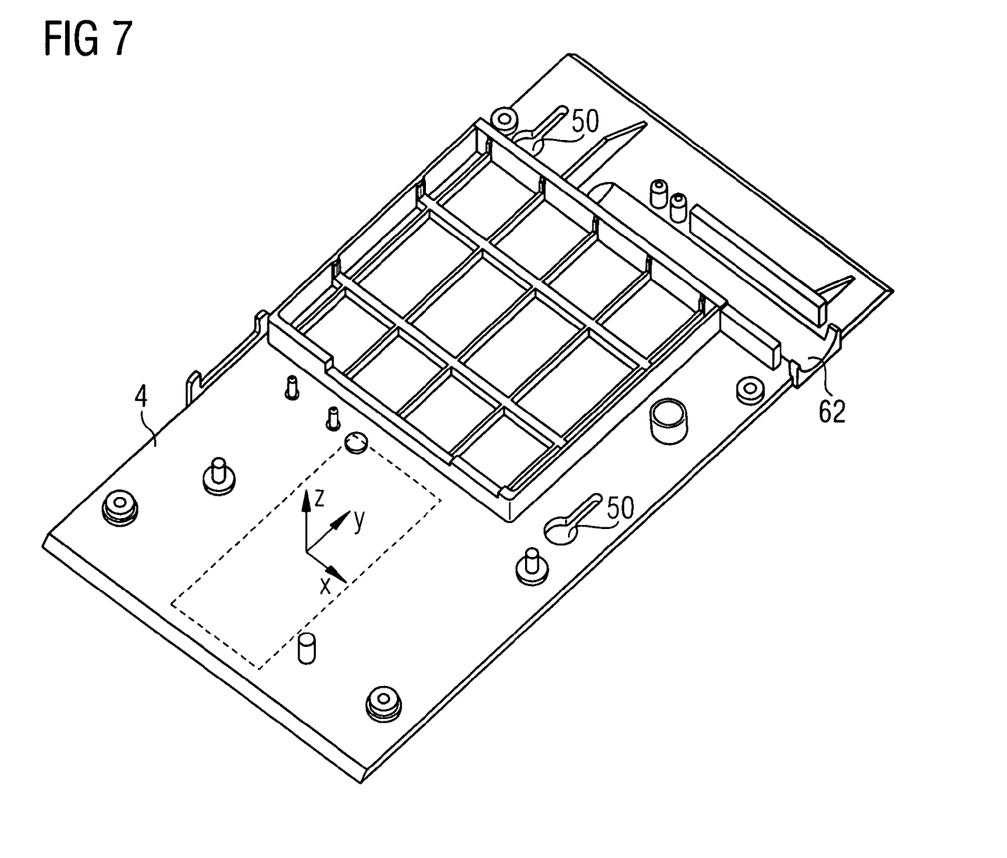
FIG. 7 shows a perspective view of a housing rear part of the device shown in FIGS. 1 and 2.

FIG. 6 shows, in a generic manner, the 'inner workings' of the embodiment shown in FIGS. 1-3 of device 1 configured to electronically capture or record signature 34. As is apparent, the electronic components 44 are located on a board 42 that is disposed underneath hand-resting surface 20 of housing 2. Unlike previously-known designs, electronic components 44 do not lie underneath input field 13. Therefore, an overall thinner design of entire device 1 is possible, as is apparent, in particular, from the side view according to FIG. 3. In case device 1 is intended to be attached to a wall or to a table, openings 50 may be provided in rear housing part 4, as shown in FIG. 7. Entire device 1 can be affixed to a base or supporting surface by inserting screws through openings 50.

Figure 8:
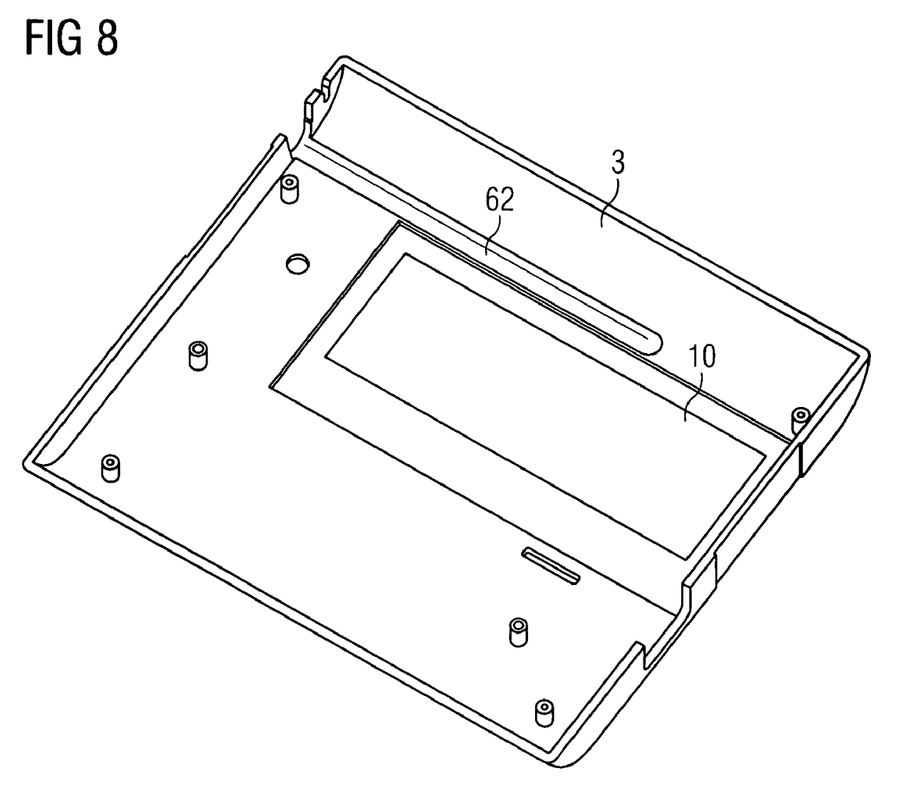
FIG. 8 shows a perspective view of the inner side of the housing front part of the device shown in FIGS. 1 and 2.

For the sake of completeness, the inner side of housing rear part 4 is shown in FIG. 7. Rear part 4 is constructed as a plastic molded part. FIG. 8 shows the inner side of front part 3 of housing 2.

Figure 9:
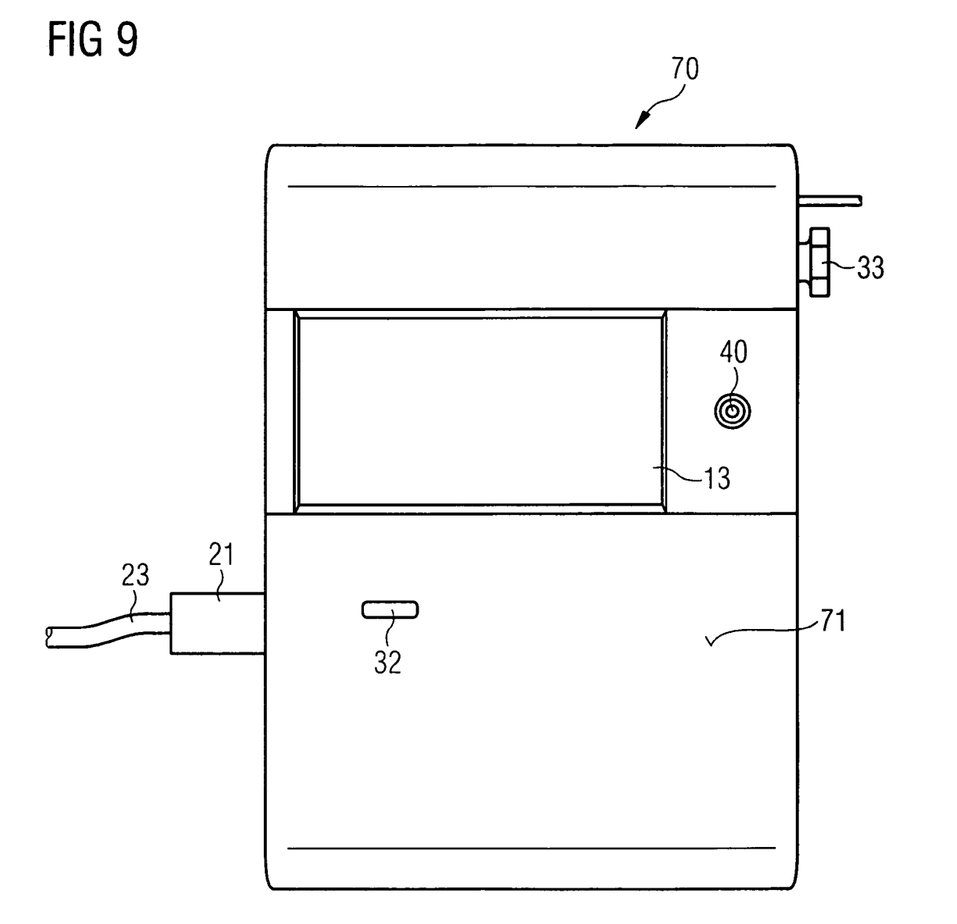
FIG. 9 shows a front view of a further exemplary embodiment of a device for electronically capturing a user input, such as, e.g., a signature; and, FIG. 10 shows a side view from the right of the device shown in FIG. 9.
Figure 10:
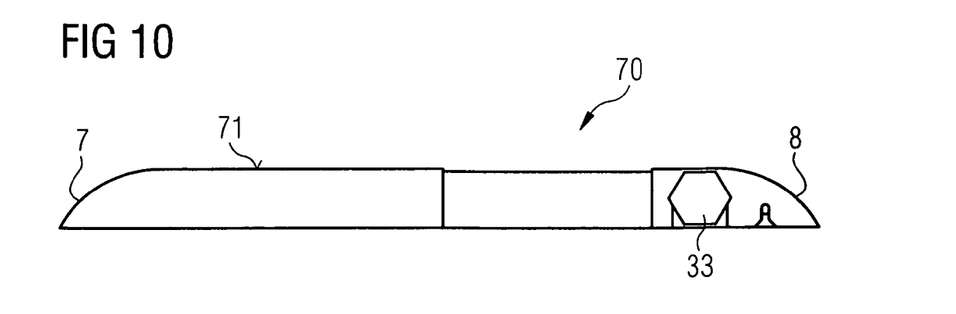

In the front view of a further exemplary embodiment of a representative device 70 for electronically capturing signature 34 shown in FIG. 9, the basic elements of the embodiment of device 1 shown in FIGS. 1-5 are the same. Contrary to the embodiment shown in FIGS. 1-5, however, a hand-resting area 71 is larger in this embodiment. In addition, data-/network cable 23 having a plug 21 is disposed on the left side of the housing. Pen 33 is accommodated in an upper insertion opening, as shown also in FIG. 10.

The larger design of hand-resting surface 71 has the advantage that a person, who has to make signature 34 on input field 13, can support his/her entire hand on the housing and in particular on hand-resting surface 71. Therefore, the user is not required to rest a part of his/her hand on a table or other surface that supports device 70. Consequently, it is even more convenient and comfortable for the user to support his/her hand and write a signature or other information into input field 13 than in the embodiment according to FIGS. 1-5.

REFERENCE NUMBERS

1 Handwritten data-capturing device
2 Housing
3 Front housing part
4 Rear housing part
5 Right edge of housing
6 Left edge of housing
7 Lower edge of housing
8 Upper edge of housing
10 Opening
13 Input field
14 Left edge of input field
15 Right edge of input field
16 Lower edge of input field
20 Surface for resting a hand while inputting handwritten data
21 Plug
22 Vertical middle line of housing
23 Cable
24 Middle line of input field
26 Horizontal middle line of housing
28 Lateral offset distance
30 Signature line
32 LED lamp
33 Pen
34 Handwritten input/signature
36 Activatable symbol
40 Pen insertion opening
42 Circuit board
44 Electronic components
50 Openings
62 Cavity for accommodating pen
70 Handwritten data-capturing device
71 Surface for resting a hand while inputting handwritten data

What is claimed is:

1. A device configured to electronically capture a handwritten user input, comprising:
   a device housing having a front side, a rear side opposite to the front side, a right housing edge, a left housing edge opposite to the right housing edge, a lower housing edge and an upper housing edge opposite to the lower housing edge; and,
   an input field integral to said device housing and configured to electronically capture in an orientation-specific manner the handwritten user input made on the input field using a writing device, the input field being disposed on or in the front side of the housing asymmetrically between the right housing edge and the left housing edge, and simultaneously being disposed asymmetrically between the lower housing edge and the upper housing edge; and,
   wherein the input field is configured to be switchable between at least two different usage positions, so that, in a first usage position, the handwritten user input is electronically captureable in said orientation-specific manner and, in a second usage position, which is different from the first usage position, the handwritten input is again electronically captureable in the same said orientation-specific manner;
   thereby a hand-resting surface provided for the user when signing on the input field on the front side of the housing is identically enlarged in both the first usage position and the second usage position by the same hand-resting area;
   wherein said input field is rotated 180 degrees with said device housing from said first usage position to said second usage position and said orientation-specific manner remains the same when said input field is tapped; and,
   wherein the input field includes a first edge and an opposing second edge and a signature line, the signature line being located proximate the first edge before the input field is tapped and located proximate to the opposing second edge when the input field is tapped.

2. The device according to claim 1, wherein the input field is configured to display a visual symbol on the input field as an input element, the symbol being activatable for reconfiguring the input field to be used in the respective first and second usage positions.

3. The device according to claim 2, wherein the device further comprises electronic components configured to operate the input field and electronically capture the handwritten user input, said electronic components being located in an interior space of the housing between the lower housing edge and the user input field.

4. The device according to claim 3, wherein the housing has a maximum thickness equal to or less than 1.3 cm.

5. The device according to claim 1, wherein a hand-resting surface is defined by the front side of the housing between the lower housing edge and the input field and the electronic components are disposed underneath the hand-resting surface.

6. The device according to claim 5, wherein the input field is disposed on the front side of the housing asymmetrically between the right housing edge and the left housing edge, the input field also being disposed asymmetrically between the lower housing edge and the upper housing edge, and wherein the input field is disposed substantially in a corner area of the housing.

7. The device according to claim 6, wherein the input field is configured to display the handwritten user input or at least an inputted element.

8. The device according to claim 7, wherein the input field is configured to display a visual symbol on the input field as an input element, the symbol being activatable for reconfiguring the input field to be used in respective first and second usage positions, which differ from each other.

9. The device according to claim 8, wherein the input field is a touch screen.

10. The device according to claim 1, wherein the input field is disposed substantially in a corner area of the housing.

11. A signature pad, comprising:
   a pad housing having a front side, a rear side opposite to the front side, a right housing edge, a left housing edge opposite to the right housing edge, a lower housing edge and an upper housing edge opposite to the lower housing edge; and
   a touch screen configured to electronically capture in an orientation-specific manner a handwritten user input made on the input field using a writing device, the touch screen being integral with and disposed on or in the front side of the housing asymmetrically between the right housing edge and the left housing edge and simultaneously disposed asymmetrically between the upper housing edge and the lower housing edge; and;
   a plurality of electronic components within said housing configured to at least one of: (i) operate the touch screen and (ii) electronically capture the handwritten user input, wherein said electronic components are located in an interior space of the housing between the lower housing edge and the touch screen and wherein the distance between the front side and the rear side of the housing is equal to or less than 1.3 cm,
   wherein the touch screen is electronically reconfigurable, such that, in a first usage position, the handwritten user input is electronically captureable in said orientation-specific manner and, in a second usage position, in which the pad housing with the integral touch screen is rotated 180° about a vertical axis relative to the first usage position, the handwritten input is also electronically captureable in the same said orientation-specific manner when said touch screen is tapped, thereby a hand-resting surface provided for the user when signing on the input field on the front side of the housing is identically enlarged in both the first usage position and the second usage position by the same hand-resting area; and,
   wherein the touch screen includes a first edge and an opposing second edge and a signature line is located proximate the first edge in the first usage position and proximate said opposing second edge in said second usage position when the touch screen is tapped.

* * * * *